Jan. 30, 1973  RYOICHI MATSUDA ET AL  3,714,381
NONINDUCTIVE ANTI-SIDETONE CIRCUIT
Filed March 4, 1971  6 Sheets-Sheet 6

INVENTORS
Ryoichi Matsuda and
Masaaki Terai
BY
Watson, Cole, Grindle & Watson
ATTYS

United States Patent Office 3,714,381
Patented Jan. 30, 1973

3,714,381
NONINDUCTIVE ANTI-SIDETONE CIRCUIT
Ryoichi Matsuda and Masaaki Terai, Tokyo, Japan, assignors to Nippon Telegraph Public Corporation, Tokyo, Japan
Continuation-in-part of abandoned application Ser. No. 706,982, Feb. 20, 1968. This application Mar. 4, 1971, Ser. No. 120,919
Claims priority, application Japan, Feb. 25, 1967, 42/11,766
Int. Cl. H04m 1/58
U.S. Cl. 179—81 A               7 Claims

ABSTRACT OF THE DISCLOSURE

This invention relates to anti-sidetone telephone circuits employing a non-reciprocal four-terminal network which does not utilize inductive elements such as hybrid transformers. Three sets of terminal pairs are formed from the four-terminal network and a terminal independent of the four-terminal network to which are respectively connected the transmitter, receiver and subscriber line. The four-terminal network includes two current sources; the first is connected between the output terminals of the network and its current output is generated as a function of the voltage applied to the input terminals of the network and a first control impedance determined from among the transmitter, receiver and the subscriber line impedances; the second current source is connected between the input terminals of the network and its current is generated as a function of the voltage applied to the output terminals of the network and a second control impedance determined from among the transmitter, receiver and the subscriber line impedances. The anti-sidetone circuit automatically effects sidetone attenuation and volume control of the transmitted signals.

---

This is a continuation-in-part of application No. 706,982, filed Feb. 20, 1968, now abandoned.

This invention relates to anti-sidetone telephone circuits and in particular to such circuits wherein non-reciprocal four-terminal networks are used which are essentially non-inductive elements.

A conventional anti-sidetone circuit used in a telephone set includes a hybrid transformer connected and arranged so as to prevent two terminal pairs from being electrically connected with each other. This is to prevent noise in the receiving room coming in through the transmitter, from appearing in the receiver earphone of the same telephone set that would tend to obstruct the telephone voices to be received and thereby reduce the intelligibility of the speech. This also prevents the voice signal from being fed back through the transmitter to the receiver earphone of the same telephone set which is annoying to the telephone user.

In order to attain the above described facilities the conventional anti-sidetone circuit uses a hybrid transformer which has excellent durability and simplicity.

However, even if an anti-sidetone circuit is electrically ideally made so that the hybrid transformer may have a sufficiently large self-inductance and a sufficiently small leakage inductance, the energy transmission from the transmitter to the subscriber line, or from the subscriber line to the receiver earphone, will be theoretically accompanied by an attenuation of 3 db. Further, due to the requirement of a low price in manufacturing telephone sets and a limitation of the space occupied by the hybrid transfomer, it is usually almost impossible to provide a simple and electrically ideal hybrid transformer. Therefore, the above described attenuation will further increases from 3 db to usualy 4 to 5 db.

Further, the modern telephone set is desired to have a so-called automatic volume control characteristic so that a constant speech level may be maintained irrespective of the length of the subscriber line in addition to the above mentioned anti-sidetone facility.

For carrying out such automatic volume control, the known conventional method will be usually accompanied by some additional electric loss, and the efficiency of the energy transmission from the transmitter to the subscriber line, or from the subscriber line to the receiver earphone, that is, the sending efficiency, or receiving efficiency, will decrease.

In order to eliminate this disadvantage, there has been adopted a method wherein a sending amplifier or receiving amplifier is merely added to the telephone circuit using a hybrid transformer. However, in such a case, an another disadvantage that the circuit will become complicated will be unavoidable and further, there will be produced a new disadvantage that the circuit will occupy a larger space.

The modern telephone set should be small in size and light in weight for convenient use. However, the conventional hybrid transformer essentially requires an iron core and a multi-layer winding. Therefore, it has proven very difficult to reduce its volume and weight.

Further, in considering parts used in the telephone set other than the anti-sidetone circuit, there is a trend to frequently use electronic devices utilizing semiconductor elements such as pushbutton dial device, an oscillator and a subscriber signaling device. Therefore, to reduce to weight and volume an integrated circuit is employed, and it is very desirable to form an anti-sidetone circuit using a semiconductor element as main component without using a hybrid transformer.

For this purpose, there may be considered such circuits as are shown, for example, in U.S. Pats. No. 3,227,812 and No. 3,170,043. However, the former has one voltage-controlled current source and therefore has no amplifying facility; and the latter has disadvantages in that the anti-sidetone facility and the amplifying facility can not be provided independently of each other, and the connections to the transmitter, receiver earphone and line are also limited.

Therefore, objects of the present invention are: to eliminate the above mentioned disadvantages and reduce the size and weight of the anti-sidetone circuit for a telephone set by utilizing semiconductor elements; and to freely increase the sending and receiving efficiencies in response to the using condition independently of the anti-sidetone facility.

A feature of the present invention relates to a circuit arrangement wherein, for transmitting, the sending signal is efficiently sent out to the subscriber line device without substantially feeding the sending signal to the receiving device and, in receiving, the receiving signal is efficiently fed to the receiving device.

Figure 1:
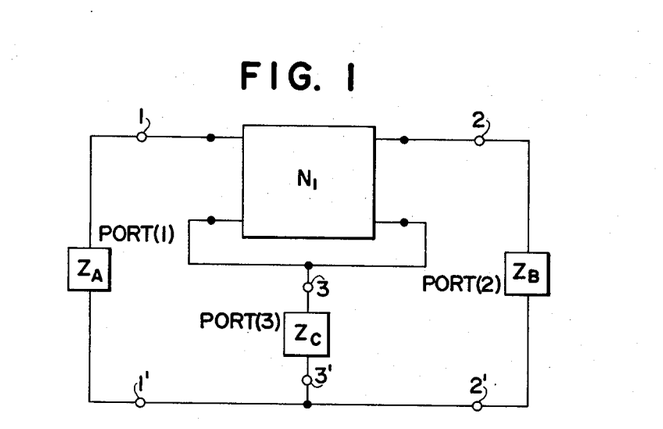
FIGS. 1 and 2 are functional network diagrams for explaining the principle of the present invention.
Figure 2:
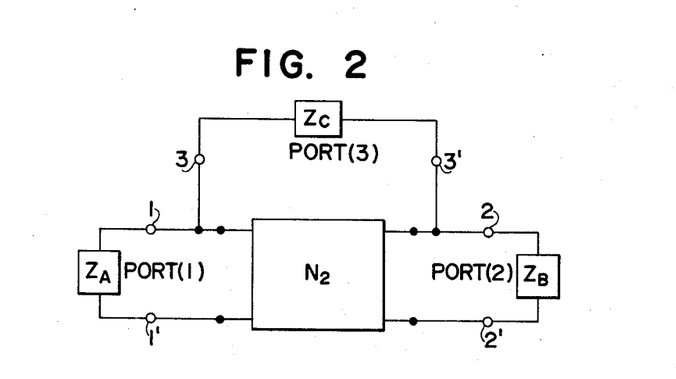

In the circuits of FIGS. 1 and 2, terminal impedances $\dot{Z}_A$, $\dot{Z}_B$ and $\dot{Z}_C$ represent a transmitter, receiver earphone, and subscriber line. When any one, or all of the transmitter, receiver earphone and subscriber line are connected to each of the four-terminal through networks $N_1$ and $N_2$ in FIGS. 1 and 2, $\dot{Z}_A$, $\dot{Z}_B$ and $\dot{Z}_C$ will represent the output impedances or input impedances of these devices. Further, $N_1$ and $N_2$ in FIGS. 1 and 2 are four-terminal networks having respective impedance matrices of $$[Z]_1 = \begin{bmatrix} 0 & -\dot{Z}_2 \\ \dot{Z}_1 & 0 \end{bmatrix} \quad (1)$$

$$[Z]_2 = \begin{bmatrix} 0 & -\dot{Z}_1 \\ \dot{Z}_2 & 0 \end{bmatrix} \quad (2)$$

The scattering matrices $[S]_1$ and $[S]_2$ of the 3-port networks, as shown in FIGS. 1 and 2, composed of connection of the impedances $\dot{Z}_A$, $\dot{Z}_B$ and $\dot{Z}_C$ with the four-terminal networks $N_1$ and $N_2$ having impedance matrices $[Z]_1$ and $[Z]_2$ are respectively as follows:

$$[S]_1 = \begin{bmatrix} \dot{S}_{11} & \dot{S}_{12} & \dot{S}_{13} \\ \dot{S}_{21} & \dot{S}_{22} & \dot{S}_{23} \\ \dot{S}_{31} & \dot{S}_{32} & \dot{S}_{33} \end{bmatrix} \quad (3)$$

$$\dot{S}_{11} = \frac{-\{\dot{Z}_A\dot{Z}_B + \dot{Z}_A\dot{Z}_C - \dot{Z}_B\dot{Z}_C + (\dot{Z}_1 - \dot{Z}_2)\dot{Z}_C - \dot{Z}_1\dot{Z}_2\}}{\Delta_1} \quad (3.a)$$

$$\dot{S}_{12} = \frac{2(\dot{Z}_2 - \dot{Z}_C)\sqrt{\dot{Z}_A\dot{Z}_B}}{\Delta_1} \quad (3.b)$$

$$\dot{S}_{13} = \frac{-2(\dot{Z}_2 + \dot{Z}_B)\sqrt{\dot{Z}_A\dot{Z}_C}}{\Delta_1} \quad (3.c)$$

$$\dot{S}_{21} = \frac{-2(\dot{Z}_1 + \dot{Z}_C)\sqrt{\dot{Z}_A\dot{Z}_B}}{\Delta_1} \quad (3.d)$$

$$\dot{S}_{22} = \frac{-\{\dot{Z}_A\dot{Z}_B - \dot{Z}_A\dot{Z}_C + \dot{Z}_B\dot{Z}_C + (\dot{Z}_1 - \dot{Z}_2)\dot{Z}_C - \dot{Z}_1\dot{Z}_2\}}{\Delta_1} \quad (3.e)$$

$$\dot{S}_{23} = \frac{2(\dot{Z}_1 - \dot{Z}_A)\sqrt{\dot{Z}_B\dot{Z}_C}}{\Delta_1} \quad (3.f)$$

$$\dot{S}_{31} = \frac{2(\dot{Z}_1 - \dot{Z}_B)\sqrt{\dot{Z}_A\dot{Z}_C}}{\Delta_1} \quad (3.g)$$

$$\dot{S}_{32} = \frac{-2(\dot{Z}_2 + \dot{Z}_A)\sqrt{\dot{Z}_B\dot{Z}_C}}{\Delta_1} \quad (3.h)$$

$$\dot{S}_{33} = \frac{-\{\dot{Z}_A\dot{Z}_B - \dot{Z}_A\dot{Z}_C + \dot{Z}_B\dot{Z}_C - (\dot{Z}_1 - \dot{Z}_2)\dot{Z}_C - \dot{Z}_1\dot{Z}_2\}}{\Delta_1} \quad (3.i)$$

$$\Delta_1 = \dot{Z}_A\dot{Z}_B + \dot{Z}_A\dot{Z}_C + \dot{Z}_B\dot{Z}_C - (\dot{Z}_1 - \dot{Z}_2)\dot{Z}_C + \dot{Z}_1\dot{Z}_2 \quad (3.j)$$

Similarly $$[s]_2 = \begin{bmatrix} \dot{S}'_{11} & \dot{S}'_{12} & \dot{S}'_{13} \\ \dot{S}'_{21} & \dot{S}'_{22} & \dot{S}'_{23} \\ \dot{S}'_{31} & \dot{S}'_{32} & \dot{S}'_{33} \end{bmatrix} \quad (4)$$

where $$\dot{S}'_{11} = \frac{-\{\dot{Z}_A\dot{Z}_B\dot{Z}_C + (\dot{Z}_1 - \dot{Z}_2)\dot{Z}_A\dot{Z}_B + \dot{Z}_1\dot{Z}_2(\dot{Z}_A - \dot{Z}_B - \dot{Z}_C)\}}{\Delta} \quad (4.a)$$

$$\dot{S}'_{12} = \frac{2\dot{Z}_1(\dot{Z}_C - \dot{Z}_2)\sqrt{\dot{Z}_A\dot{Z}_B}}{\Delta_2} \quad (4.b)$$

$$\dot{S}'_{13} = \frac{-2\dot{Z}_1(\dot{Z}_B + \dot{Z}_2)\sqrt{\dot{Z}_A\dot{Z}_C}}{\Delta_2} \quad (4.c)$$

$$\dot{S}'_{21} = \frac{-2\dot{Z}_2(\dot{Z}_1 + \dot{Z}_C)\sqrt{\dot{Z}_B\dot{Z}_A}}{\Delta_2} \quad (4.d)$$

$$\dot{S}'_{22} = \frac{-\{\dot{Z}_A\dot{Z}_B\dot{Z}_C + (\dot{Z}_1 - \dot{Z}_2)\dot{Z}_A\dot{Z}_B - \dot{Z}_1\dot{Z}_2(\dot{Z}_A - \dot{Z}_B + \dot{Z}_C)\}}{\Delta_2} \quad (4.e)$$

$$\dot{S}'_{23} = \frac{2\dot{Z}_2(\dot{Z}_A - \dot{Z}_1)\sqrt{\dot{Z}_B\dot{Z}_C}}{\Delta^2} \quad (4.f)$$

$$\dot{S}'_{31} = \frac{2\dot{Z}_2(\dot{Z}_B - \dot{Z}_1)\sqrt{\dot{Z}_A\dot{Z}_C}}{\Delta_2} \quad (4.g)$$

$$\dot{S}'_{32} = \frac{-2\dot{Z}_1(\dot{Z}_A + \dot{Z}_2)\sqrt{\dot{Z}_B\dot{Z}_C}}{\Delta_2} \quad (4.h)$$

$$\dot{S}'_{33} = \frac{-\{\dot{Z}_A\dot{Z}_B\dot{Z}_C - (\dot{Z}_1 - \dot{Z}_2)\dot{Z}_A\dot{Z}_B - \dot{Z}_1\dot{Z}_2(\dot{Z}_A + \dot{Z}_B - \dot{Z}_C)\}}{\Delta_2} \quad (4.i)$$

$$\Delta_2 = \dot{Z}_A\dot{Z}_B\dot{Z}_C + (\dot{Z}_1 - \dot{Z}_2)\dot{Z}_A\dot{Z}_B + \dot{Z}_1\dot{Z}_2(\dot{Z}_A + \dot{Z}_B + \dot{Z}_C) \quad (4.j)$$

A scattering matrix indicates how the electric power applied to the respective ports is distributed to the terminal impedances of other ports.

Figure 7:
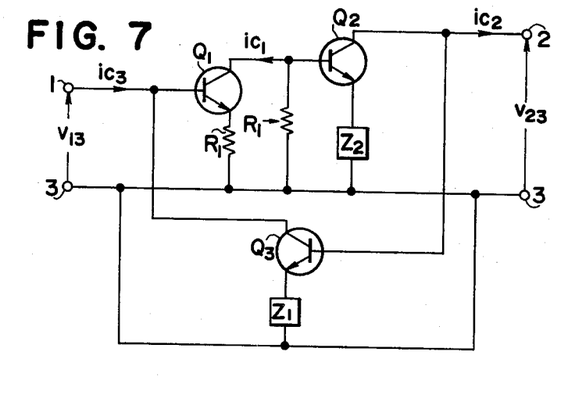
FIGS. 7 and 8 are diagrams showing transistor circuit embodiments of the circuits shown in FIGS. 5 and 6, respectively.

Accordingly, an element $\dot{S}ii$ (or $\dot{S}ii'$) of the scattering matrix $[S]_1$ (or $[S]_2$) will be a reflection coefficient in a port $(i)$ of the network in FIG. 1 (or FIG. 2) and an element $Sij$ (or $S'ij$) of the scattering matrix $[S]_1$ (or $[S]_2$) will be a transmission coefficient from a port $(j)$ to a port $(i)$ of the network in FIG. 7 (or FIG. 2).

Therefore, a working attenuation from the port $(j)$ to the port $(i)$ will be given by $$b = -20 \log_{10}[Sij] \text{ (db)} \quad (5)$$

Here, in $[S]_1$ and $[S]_2$, if $\dot{Z}_1 = \dot{Z}_{A'}$ $$\dot{S}_{23} = \dot{S}'_{23} = 0 \quad (6)$$

if $\dot{Z}_1 = \dot{Z}_{B'}$ $$\dot{S}_{31} = \dot{S}'_{31} = 0 \quad (7)$$

and if $\dot{Z}_2 = \dot{Z}_{C'}$ $$\dot{S}_{12} = \dot{S}'_{12} = 0 \quad (8)$$

The above Equations 6, 7 and 8 indicate that in the circuits shown in FIGS. 1 and 2 the electric power transmission is not transmitted from the terminal pair (3–3′) to the terminal pair (2–2′), from the terminal pair (1–1′) to the terminal pair (3–3′) and from the terminal pair (2–2′) to the terminal pair (1–1′) respectively.

Therefore, if the transmitter, receiver and subscriber line are connected to the respective terminal pairs in FIGS. 1 and 2, as shown in Table 1, the power will be transmitted from the transmitter to the subscriber line and from the subscriber line to the receiver, but no power will be transmitted from the transmitter to the receiver, that is, a sidetone will be inhibited so that an anti-sidetone circuit of the telephone set may be formed.

TABLE 1

| | | I | II | III |
|---|---|---|---|---|
| 1 | $\dot{Z}_A$ | Subscriber line ($Z_L$). | Transmitter ($Z_T$). | Receiver ($Z_R$). |
| 2 | $\dot{Z}_B$ | Receiver ($Z_R$). | Subscriber line ($Z_L$). | Transmitter ($Z_T$). |
| 3 | $\dot{Z}_C$ | Transmitter ($Z_T$). | Receiver ($Z_R$). | Subscriber line ($Z_L$). |
| Sidetone balance condition | | $Z_1 = (Z_L)$. | $Z_2 = (Z_L)$. | $Z_2 = (Z_L)$. |

Accordingly, six anti-sidetone circuits may be formed by associating the devices in columns I, II and III of Table 1 with the terminal impedances $\dot{Z}_A$, $\dot{Z}_B$, $\dot{Z}_C$ in FIGS. 1 and 2.

For example, the terminal impedances $\dot{Z}_A$, $\dot{Z}_B$ and $\dot{Z}_C$ and the anti-sidetone circuit composed by applying the connection I in Table 1 to FIG. 1 are represented as the subscriber line impedance $\dot{Z}_L$, the receiver impedance $\dot{Z}_R$ and the transmitter impedance $\dot{Z}_T$, respectively. A sidetone balance network is impedance $\dot{Z}_1$.

Therefore, a sending attenuation $b_T$ from the transmitter to the subscriber line receiving attenuation $b_R$ from the subscriber line to the receiver and sidetone attenuation $b_S$ from the transmitter to the receiver of the anti-sidetone circuit formed by applying the connection No. I in Table 1 to FIG. 1 may be obtained as follows by Equation 5.

$$b_T = -20 \log_{10} |\dot{S}_{13}| = 20 \log_{10} \left| \frac{\dot{\Delta}_1}{2(\dot{Z}_2 + \dot{Z}_R)\sqrt{\dot{Z}_T \dot{Z}_L}} \right| (db) \quad (9)$$

$$b_R = -20 \log_{10} |\dot{S}_{21}| = 20 \log_{10} \left| \frac{\dot{\Delta}_1}{2(\dot{Z}_2 + \dot{Z}_T)\sqrt{\dot{Z}_R \dot{Z}_L}} \right| (db) \quad (10)$$

$$b_S = -20 \log_{10} |\dot{S}_{23}| = 20 \log_{10} \left| \frac{\dot{\Delta}_1}{2(\dot{Z}_1 - \dot{Z}_L)\sqrt{\dot{Z}_T \dot{Z}_R}} \right| (db) \quad (11)$$

where $$\dot{\Delta}_1 = \dot{Z}_L \dot{Z}_R + \dot{Z}_L \dot{Z}_T + \dot{Z}_R \dot{Z}_T - (\dot{Z}_1 - \dot{Z}_2)\dot{Z}_T + \dot{Z}_1 \dot{Z}_2$$

In the Formula 11 it can be seen that if $\dot{Z}_1 = \dot{Z}_L (=\dot{Z}_A)$ the sidetone attenuations $b_S$ will become infinite and accordingly, the sidetone will become zero.

The sending attenuation and the receiving attenuation under the above mentioned sidetone balancing condition will be expressed as follows:

$$b_T = 20 \log_{10} \left| \frac{\dot{Z}_T + \dot{Z}_L}{2\sqrt{\dot{Z}_T \dot{Z}_L}} \right| (db) \quad (12)$$

$$b_R = 20 \log_{10} \left| \frac{\dot{Z}_R + \dot{Z}_2}{2\sqrt{\dot{Z}_R \dot{Z}_L}} \right| (db) \quad (13)$$

In the Formulas 12 and 13 the sending attenuation and the receiving attenuation do not become infinite so that the power will be transmitted from the transmitter to the subscriber line and from the subscriber line to the receiver.

For the other connections given in Table 1 the same analysis as above-mentioned can be made. Therefore, it can be confirmed that all circuits formed by the connections in Table 1 are an anti-sidetone circuit.

By properly selecting the values of $\dot{Z}_R$, $\dot{Z}_T$ and $\dot{Z}_2$ from the Formulas 12 and 13 the values of $b_T$ and $b_R$ can be varied.

Figure 3:
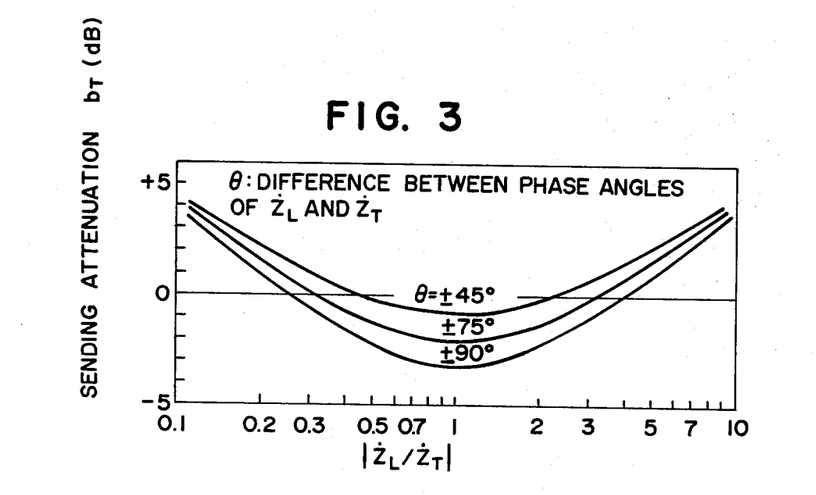
FIGS. 3 and 4 illustrate the electric characteristics of a telephone speech network according to the present invention.
Figure 4:
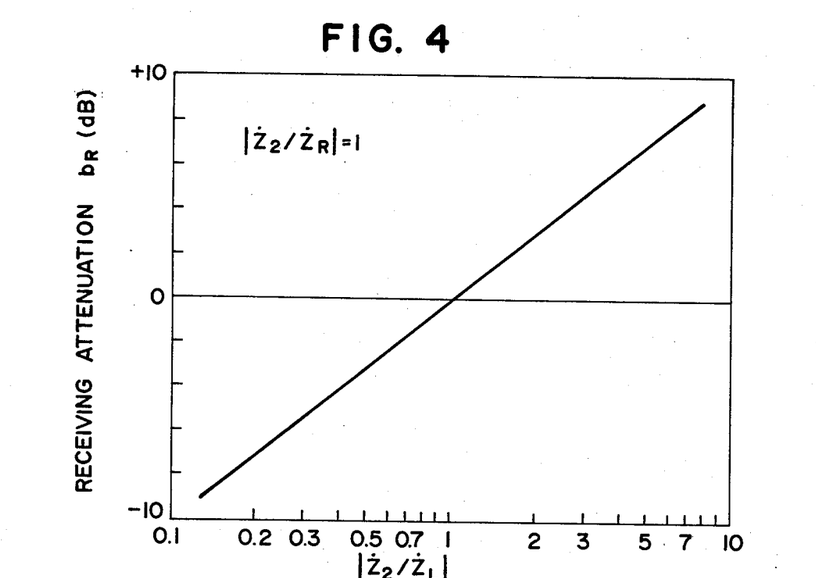

FIG. 3 shows an example of the value of $b_T$ as a function of $|\dot{Z}_L/\dot{Z}_T|$. FIG. 4 shows an example of the value of $b_R$ as a function of $|\dot{Z}_2/\dot{Z}_L|$. It is shown that, by properly selecting the values of $|\dot{Z}_L/\dot{Z}_T|$ and $|\dot{Z}_2/\dot{Z}_L|$, sending amplifications and receiving amplifications are possible. Also, the magnitudes of these amplifications are independent of the impedance $\dot{Z}_1$ related to the sidetone balance. This enables the amplification to be set independently of the inhibition of sidetones.

Now, for example, where $\dot{Z}_L = 600\Omega \angle -45°$, $\dot{Z}_R = 300\Omega$, $\dot{Z}_T = 300\Omega$ and $\dot{Z}_2 = 120\Omega$ and where $\dot{Z}_L = 600\Omega \angle -45°$, $\dot{Z}_R = 120\Omega$, $\dot{Z}_T = 600\Omega$ and $\dot{Z}_2 = 60\Omega$, if $b_T$ and $b_R$ in the Formulas 11 and 12 are respectively calculated, they will be $b_T = 0$ db, $b_R = -6$ db, and $b_T = -1.0$ db, $b_R = -10.5$ db.

Further, the values of $b_T$ and $b_R$ are considerably smaller than the values of the sending and receiving attenuations obtained in the conventional anti-sidetone circuit. Thus it can be understood that the sending and receiving efficiencies can be very simply improved by the circuit according to the present invention. The above mentioned example is for the case of applying the connection I in Table 1 to FIG. 1. With any of the other combinations the same result will be obtained.

Figure 5:
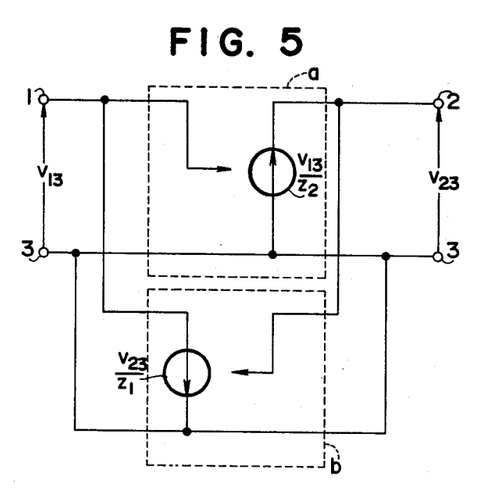
FIGS. 5 and 6 are diagrams showing two voltage-controlled current sources which realize four-terminal networks $N_1$ and $N_2$ in FIGS. 1 and 2, respectively.
Figure 6:
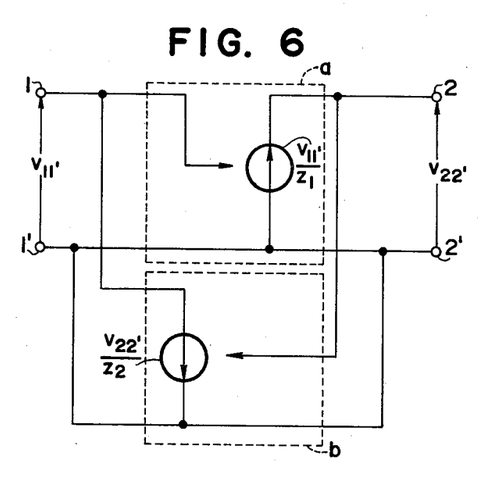

The four-terminal network $N_1$ in FIG. 1 is obtained in principle by utilizing two voltage-controlled current sources designated $a$ and $b$. That is to say, as shown in FIG. 5, a voltage-controlled current source of a magnitude $V_{13}/Z_2$ proportional to the voltage $V_{13}$ of the terminal 1 to the terminal 3 may be connected to the terminals 2–3, and simultaneously a current source of a magnitude $V_{23}/Z_1$ proportional to the voltage $V_{23}$ of the terminal 2 to the terminal 3 may be connected to the terminals 1–3. In the same manner, the four-terminal network $N_2$ in FIG. 2 is obtained with such two voltage-controlled current sources as shown in FIG. 6. FIGS. 5 and 6, the phase relations between output current and input voltage of the voltage-controlled current sources are indicated by the arrows.

Figure 8:
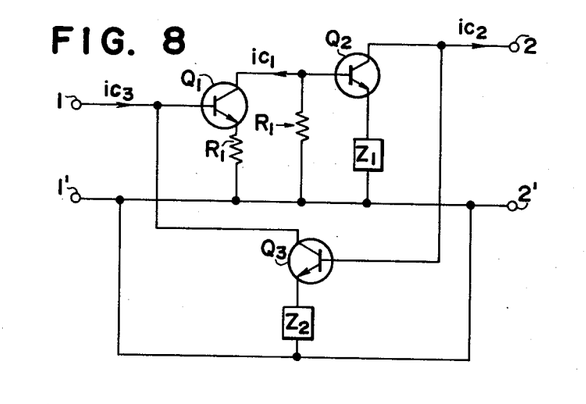
Figure 9:
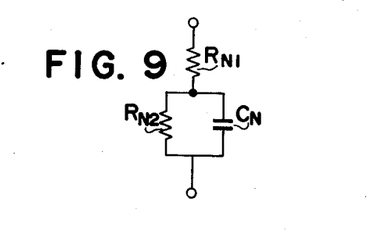
FIG. 9 is a diagram of a resistance-capacitance network which realize impedances $Z_1$ and $Z_2$ in FIGS. 7 and 8.

The circuits shown in FIGS. 5 and 6 can be composed essentially of the transistor circuits shown in FIGS. 8 and 9, respectively.

That is, if the transistor is ideal, the voltage-controlled current source $(a)$ shown in FIG. 5 may be composed of the transistors $Q_1$ and $Q_2$, resistance $R_1$ and network $\dot{Z}_2$; and another voltage-controlled current source $(b)$ may be composed of the transistor $Q_3$ and network $Z_1$.

In FIG. 7 due to the voltage $V_{13}$ of the terminals 1 to 3 the current $ic_1$ of a magnitude of $V_{13}/R_1$ flows to the collector of the transistor $Q_1$ in the direction indicated by the arrows. Therefore, if the load of the transistor $Q_1$ is made equal to the outer resistance $R_1$ of the emitter of the transistor $Q_1$, the magnitude of the collector voltage will be equal to that of $V_{13}$ and the phase thereof will become reversed. Thus, the current $ic_2$ of a magnitude $V_{13}/\dot{Z}_2$ flows to the collector of the transistor $Q_3$ in the direction indicated by the arrows. The current $ic_3$ of a magnitude $V_{23}/Z_1$ flows to the collector of the transistor $Q_3$ in the direction indicated by the arrows.

The transistors $Q_2$ and $Q_3$ can be considered to be the current sources of the output currents $ic_2$ and $ic_3$, respectively, as they have high output impedance. Therefore, the circuit shown in FIG. 7 becomes equivalent to the circuit in FIG. 6. Similarly, the circuit in FIG. 8 becomes equivalent to the circuit in FIG. 6.

The networks $\dot{Z}_2$ and $\dot{Z}_1$ connected to the emitters of the transistors $Q_2$ and $Q_3$ are the resistance-capacitance networks as shown in FIG. 9, either of which is made to be equivalent to the subscriber line impedance.

Figure 10:
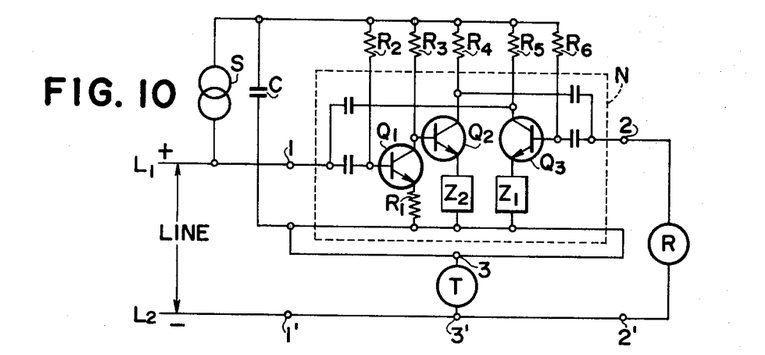
FIGS. 10 to 15 are schematic circuit diagrams of telephone set speech networks in accordance with invention.

FIG. 10 is an embodiment of the telephone speech network obtained by connecting a transmitter, receiver and subscriber line as set forth in column I of Table 1 relative to the functional network shown in FIG. 1. N is the four-terminal network shown in FIG. 7, T is a transmitter, R is a receiver, $L_1$–$L_2$ is a terminal pair to which the subscriber line is connected, and $Z_1$ and $Z_2$ are two-terminal R–C networks. The direct current to the transistors in the circuit is fed from the subscriber line through a power supply filter consisting of constant current circuit S, condenser C, and biasing resistors $R_2$–$R_6$.

Figure 11:
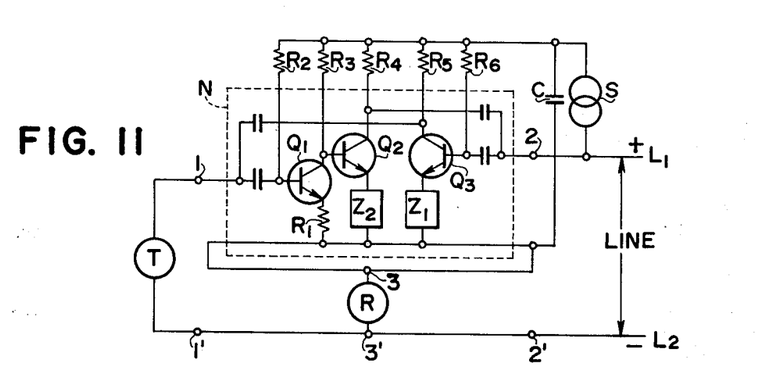
Figure 12:
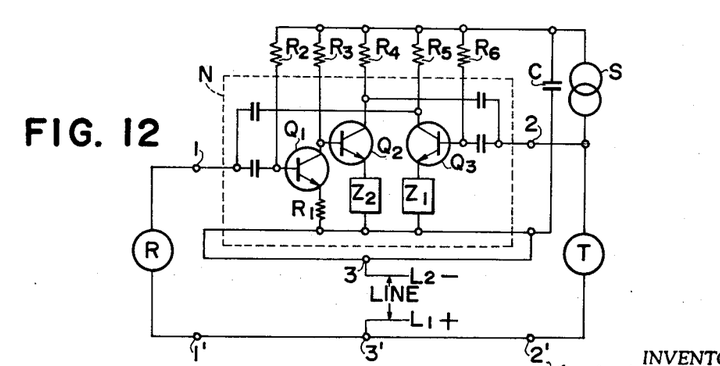
Figure 13:
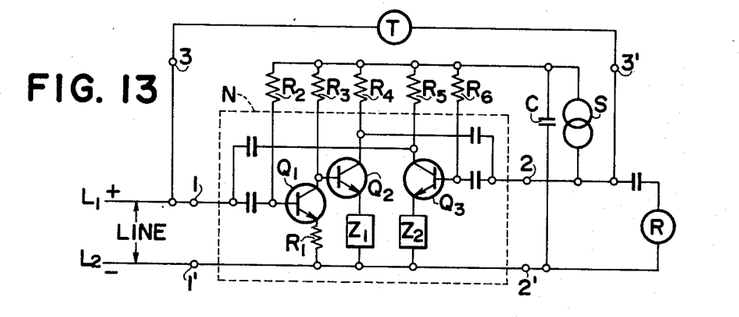
Figure 14:
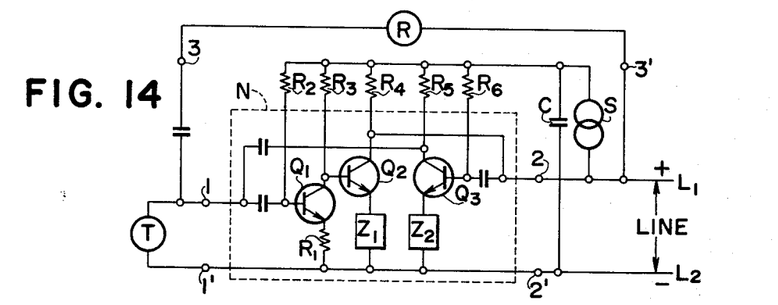
Figure 15:
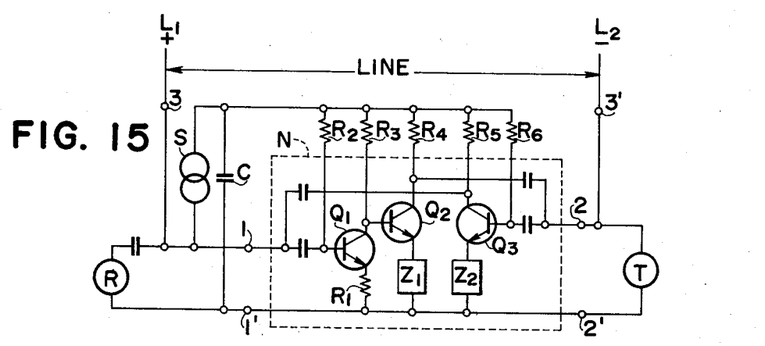

FIGS. 11 and 12 are, respectively, an embodiment of the telephone speech network obtained by connecting a transmitter, receiver and subscriber line as set forth in columns II and III of Table 1, respectively, on the basis of the functional network shown in FIG. 1. The reference numerals of each element shown in these figures have the same numeral designation as the corresponding elements shown in FIG. 10. FIGS. 13, 14 and 15 are respectively other embodiments of the telephone speech network obtained by connecting the transmitter, receiver and subscriber line as set forth in columns I, II and III of Table 1, respectively, relative to the functional network shown in FIG. 2. In these figures the reference numerals of each element have the same numeral designation as the corresponding elements shown in FIG. 10.

As described above, in the telephone circuit according to the present invention, favorable anti-sidetone characteristics can be realized very simply at the same time the sending attenuation and receiving attenuation can be controlled independently of the prevention of sidetones and the sending efficiency and receiving efficiency can be improved. Further, in the telephone circuit according to the present invention, no hybrid transformer is used but a semiconductor element is made a main component. Therefore, if the utilization of an integrated circuit therein is considered, the telephone circuit will be able to be made small and light.

What is claimed is:

1. A telephone anti-sidetone circuit, comprising: transmitting means, receiving means, a subscriber line, and a non-reciprocal four-terminal network with input and output terminals for connecting said transmitting means, receiving means and said subscriber line, said four-terminal network comprising first and second current sources including first and second impedance means having an impedance value $Z_1$ and $Z_2$ respectively, said first current source being electrically connected between said output terminals, the output current $i_1$ of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

2. A telephone anti-sidetone circuit, comprising: a subscriber line, transmitting means, receiving means, and a non-reciprocal four-terminal network having input terminals and output terminals, said subscriber line being connected to a first terminal pair formed by one of said input terminals and a terminal independent of said non-reciprocal network, said receiving means being connected to a second terminal pair formed by one of said output terminals and said independent terminal, and said transmitting means being connected to a third terminal pair formed by said independent terminal and the common connection of the other of said input and output terminals, said four-terminal network comprising first and second current sources including first and second impedance means having an impedance $Z_1$ and $Z_2$ respectively, said first current source being electrically connected between said output terminals, the output current $i_1$ of said first current source being determined by $V_1/Z_1$ where $V_1$ is the voltage at said input terminals, said second current source electrically connected between said input terminals, the output current $i_2$ of said second current source being determined by $V_2/Z_2$ where $V_2$ is the voltage at said output terminals.

3. A telephone anti-sidetone circuit, comprising: a subscriber line, receiving means, transmitting means, and a non-reciprocal four-terminal network having input terminals and output terminals, said subscriber line being connected to a first terminal pair formed by said input terminals, said receiving means being connected to a second terminal pair formed by said output terminals, and said transmitting means being connected to a third terminal pair formed by one of said input terminals and one of said output terminals, said four-terminal network comprising first and second current sources including first and second impedance means having an impedance $Z_1$ and $Z_2$ respectively, said first current source being electrically connected between said output terminals, the output current $i_1$ of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

4. A telephone anti-sidetone circuit, comprising: a subscriber line, transmitting means, receiving means, and a non-reciprocal four-terminal network having input terminals and output terminals, said transmitting means being connected to a first terminal pair formed by one of said input terminals and a terminal independent of said non-reciprocal network, said subscriber line being connected to a second terminal pair formed by one of said output terminals and said independent terminal, and said receiving means being connected to a third terminal pair formed by said independent terminal and the common connection of the other of said input and output terminals, said four-terminal network comprising first and second current sources including first and second impedance means having an impedance $Z_1$ and $Z_2$ respectively, said first current source being electrically connected between said output terminals, the output current $i_1$ of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

5. A telephone anti-sidetone circuit, comprising: a subscriber line, transmitting means, receiving means, and a non-reciprocal four-terminal network having input terminals and output terminals, said receiving means being connected to a first terminal pair formed by one of said input terminals and a terminal independent of said non-reciprocal network, said transmitting means being connected to a second terminal pair formed by one of said output terminals and said independent terminal, and said subscriber line being connected to a third terminal pair formed by said independent terminal and the common connection of the other of said input and output terminals said four-terminal network comprising first and second current sources including first and second impedance means having an impedance $Z_1$ and $Z_2$ respectively, said first current source being electrically connected between said output terminals, the output current $i$, of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

6. A telephone anti-sidetone circuit, comprising: a subscriber line, receiving means, transmitting means, and a non-reciprocal four-terminal network having input terminals and output terminals, said transmitting means being connected to a first terminal pair formed by said input terminals, said subscriber line being connected to a second terminal pair formed by said output terminals, and said receiving means being connected to a third terminal pair formed by one of said input terminals and one of said output terminals, said four-terminal network comprising first and second current sources including first and second impedance means having an impedance $Z_1$ and $Z_2$ respectively, said first current source being electrically connected between said output terminals, the output current $i_1$ of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

7. A telephone anti-sidetone circuit, comprising: a subscriber line, receiving means, transmitting means, and a non-reciprocal four-terminal network having input terminals and output terminals, said receiving means being connected to a first terminal pair formed by said input terminals, said transmitting means being connected to a second terminal pair formed by said output terminals, and said subscriber line being connected to a third terminal pair formed by one of said input terminals and one of said output terminals, said four-terminal network comprising first and second current sources including first and second impedance means having an impedance $Z_1$ and $Z_2$ respectively, said first current source being electrically connected between said output terminals, the output current $i_1$ of said first current source being determined by $V_1/Z_1$ where $V_1$ is the voltage at said input terminals, said second current source being electrically connected between said input terminals, the output current $i_2$ of said second current source being determined by $V_2/Z_2$ where $V_2$ is the voltage at said output terminals.

References Cited

UNITED STATES PATENTS

| | | | |
|---|---|---|---|
| 3,227,812 | 1/1966 | Schlicte | 179—81 A |
| 3,546,395 | 12/1970 | Schuh | 179—81 A |
| 3,440,367 | 4/1969 | Holtz | 179—170 N C |
| 3,597,550 | 8/1971 | Sternbeck | 179—81 A |

KATHLEEN H. CLAFFY, Primary Examiner

W. A. HELVESTINE, Assistant Examiner

U.S. Cl. X.R.

179—170 N C